(12) United States Patent
Kodaira

(10) Patent No.: US 8,479,858 B2
(45) Date of Patent: Jul. 9, 2013

(54) BATTERY ARRANGEMENT STRUCTURE OF VEHICLE

(75) Inventor: Masanori Kodaira, Hiroshima (JP)

(73) Assignee: Mazda Motor Corporation (JP)

( * ) Notice: Subject to any disclaimer, the term of this patent is extended or adjusted under 35 U.S.C. 154(b) by 288 days.

(21) Appl. No.: 12/950,254

(22) Filed: Nov. 19, 2010

(65) Prior Publication Data

US 2011/0132676 A1   Jun. 9, 2011

(30) Foreign Application Priority Data

Dec. 3, 2009  (JP) ................................ 2009-275507
Dec. 3, 2009  (JP) ................................ 2009-275511
Jan. 27, 2010 (JP) ................................ 2010-014984

(51) Int. Cl.
*B60R 16/04*  (2006.01)

(52) U.S. Cl.
USPC ........................................... 180/68.5; 180/90

(58) Field of Classification Search
USPC ............. 180/65.31, 65.6, 68.5, 89.1, 90, 65.1, 180/65.21; 701/22
See application file for complete search history.

(56) References Cited

U.S. PATENT DOCUMENTS

| | | | | |
|---|---|---|---|---|
| 2,254,552 A | * | 9/1941 | Tjaarda | 318/139 |
| 3,983,952 A | * | 10/1976 | McKee | 280/778 |
| 4,216,839 A | * | 8/1980 | Gould et al. | 180/65.1 |
| 5,015,545 A | * | 5/1991 | Brooks | 429/99 |
| 7,048,321 B2 | * | 5/2006 | Bandoh et al. | 296/37.8 |
| 7,540,343 B2 | * | 6/2009 | Nakashima et al. | 180/65.1 |
| 7,836,999 B2 | * | 11/2010 | Kato | 180/312 |
| 7,913,787 B2 | * | 3/2011 | Watanabe et al. | 180/68.5 |
| 8,118,125 B2 | * | 2/2012 | Suzuki et al. | 180/68.5 |

FOREIGN PATENT DOCUMENTS

| | | | |
|---|---|---|---|
| DE | 4032605 A1 | * | 3/1992 |
| JP | 07172188 | * | 7/1995 |
| JP | 10138956 | * | 5/1998 |
| JP | 2007-039004 A | | 2/2007 |
| JP | 2008001147 A | * | 1/2008 |

* cited by examiner

*Primary Examiner* — Hau Phan
*Assistant Examiner* — Bridget Avery
(74) *Attorney, Agent, or Firm* — Studebaker & Brackett PC

(57) ABSTRACT

In a vehicle which comprises an electric motor to drive front wheels and/or rear wheels of the vehicle, a battery to supply an electric power to the electric motor, a dash panel partitioning a vehicle-inside space from a vehicle-front side space located in front of the vehicle-inside space, a floor panel partitioning the vehicle-inside space from a vehicle outside located below the vehicle-inside space, and a tunnel portion provided at the floor panel so as to project upwardly toward an inside of the vehicle-inside space, the battery is arranged so that a front-side part thereof is positioned in front of the dash panel and a rear-side part thereof is positioned inside of the tunnel portion in the vehicle longitudinal direction. Accordingly, an appropriate weight balance of the vehicle between front wheels and rear wheels of the vehicle can be provided.

18 Claims, 15 Drawing Sheets

BATTERY ARRANGEMENT STRUCTURE OF VEHICLE

BACKGROUND OF THE INVENTION

The present invention relates to a battery arrangement structure of a vehicle, such as an electric vehicle.

A weight balance (longitudinal weight balance) of the vehicle between front wheels and rear wheels of the vehicle considerably influences the force of inertia during the vehicle acceleration or deceleration or the like, and therefore controls the vehicle's traveling stability and maneuverability. Accordingly, arrangements of various devices installed on the vehicle are designed to provide an appropriate weight balance of the vehicle. For example, in an FF (front engine/front drive) type of gasoline automotive vehicle, some installed devices, such as an engine and a fuel tank, are generally arranged so that the above-described longitudinal weight balance of this vehicle can be about 6:4.

Herein, the electric vehicle may also require its longitudinal weight balance similar to the above-described balance of the FF type of gasoline automotive vehicle. In this case, since the electric vehicle is equipped with a large-sized battery instead of the engine and the fuel tank, an arrangement of the battery may considerably influence the longitudinal weight balance of the vehicle, and therefore control the traveling stability and maneuverability of the electric vehicle.

While the battery is generally arranged in a trunk room or a space in front of a dash panel at a vehicle front portion of the electric vehicle, some other different arrangements of the battery have been considered as well. Japanese Patent Laid-Open Publication No. 2007-39004, for example, discloses a structure in which a center console is formed at a floor panel so as to extend from a dash panel to the vicinity of a rear seat, and a battery is arranged in this center console.

In the electric vehicle, in case the battery is arranged in the space in front of the dash panel, the weight balance of the vehicle may be improperly one-sided to the front-wheel side. Meanwhile, in case the battery is arranged in the trunk room, the weight balance of the vehicle may be improperly one-sided to the rear-wheel side to the contrary. Further, in case the battery is arranged in the center console as disclosed in the above-described publication, the arrangement of the battery is restricted between the dash panel and the rear seat, so that the flexibility of arrangement of the longitudinal weight balance may deteriorate. Therefore, the longitudinal weight balance of the vehicle may become too great, compared with the appropriate balance, such as 6:4.

SUMMARY OF THE INVENTION

An object of the present invention is to provide a battery arrangement structure of a vehicle which can provide an appropriate weight balance of the vehicle between front wheels and rear wheels of the vehicle.

According to the present invention, there is provided a battery arrangement structure of a vehicle, comprising an electric motor to drive front wheels and/or rear wheels of the vehicle, a battery to supply an electric power to the electric motor, a dash panel partitioning a vehicle-inside space from a vehicle-front side space located in front of the vehicle-inside space, a floor panel partitioning the vehicle-inside space from a vehicle outside located below the vehicle-inside space, and a tunnel portion provided at the floor panel so as to project upwardly toward an inside of the vehicle-inside space, the tunnel portion extending substantially in a vehicle longitudinal direction so as to have a longitudinal substantially-straight center line thereof, wherein the battery is arranged at a specified position, in a vehicle width direction, which is located on the longitudinal substantially-straight center line of the tunnel portion, and at least a front-side portion of the battery is positioned in front of the dash panel in the vehicle longitudinal direction.

According to the present invention, since at least the front-side portion of the battery is positioned in front of the dash panel in the vehicle longitudinal direction, the flexibility of arrangement of the longitudinal weight balance of the vehicle, such as the electric vehicle, can be secured, so that the appropriate longitudinal weight balance of the vehicle can be provided. Accordingly, the proper vehicle's traveling stability and maneuverability can be obtained.

According to an embodiment of the present invention, the battery is arranged so that a front-side part thereof is positioned in front of the dash panel and a rear-side part thereof is positioned inside of the tunnel portion in the vehicle longitudinal direction. Thereby, since the rear-side part of the battery is stored in the tunnel portion of the floor panel, a large-enough volume of the battery can be secured, restraining upward projection of the floor panel, in addition to the above-described advantage according to the present invention. Accordingly, the vehicle-inside space is not restricted improperly by the restraint of the floor panel's projection, so that the proper conformability of passengers in the vehicle-inside space can be obtained. Further, since the appropriate battery volume is secured, a long-enough traveling distance of the vehicle can be obtained.

Herein, in place of the above-described embodiment, the battery may be arranged so that a whole part thereof is positioned in front of the dash panel outside of the tunnel portion. In this case, the above-described advantage according to the present invention can be provided as well.

According to another embodiment of the present invention, the battery arrangement structure of a vehicle further comprises a front seat and a rear seat which are provided on the floor panel, wherein the tunnel portion extends rearwardly from the dash panel to a specified position beside a lower end of a seatback of the front seat. Thereby, a foot space for a passenger seated in the rear seat is not restricted by the tunnel portion, so that the proper conformability of the passenger seated in the rear seat can be obtained.

According to another embodiment of the present invention, the electric motor is arranged in front of the dash panel, and at least part of the electric motor overlaps with the battery in the vehicle longitudinal direction. Thereby, the electric motor can be arranged properly by using a space beside a part of the battery positioned in front of the dash panel.

According to another embodiment of the present invention, the battery arrangement structure of a vehicle further comprises a drive shaft provided in front of the dash panel, which extends in the vehicle width direction and is coupled to drive the front wheel, wherein the battery is arranged so that a front end thereof is positioned right behind the drive shaft. Thereby, the battery can be positioned as forwardly as possible, avoiding any interference of the battery with the drive shaft, so that the battery volume can be enlarged.

Herein, in place of the above-described embodiment, the battery may be arranged so that a front end thereof is positioned above the drive shaft. In this case, the battery can be positioned as forwardly as possible, avoiding any interference of the battery with the drive shaft, so that the battery volume can be enlarged as well.

According to another embodiment of the present invention, the battery is mounted on a suspension support member supporting a suspension for a front wheel of the vehicle. Thereby, it is unnecessary to provide any other support member to support the battery additionally, so that any increase of the number of parts can be restrained.

According to another embodiment of the present invention, the battery arrangement structure of a vehicle further comprises a pair of front side frames which is provided at both side portions of the vehicle so as to extend in the vehicle longitudinal direction, wherein the suspension support member comprises a sub frame connected to the front side frames and a battery support portion provided below the floor panel, and the sub frame and the battery support portion are formed integrally as a unit. Thereby, the battery can be securely supported from a lower side of the floor panel via the battery support portion of the suspension support member. Further, since the sub frame and the battery support portion are formed integrally as a unit, reduction of the parts number or assembling steps can be achieved.

According to another embodiment of the present invention, the battery is provided at a vehicle-body member attached to the vehicle so that the battery is movable rearwardly in the tunnel portion in accordance with a rearward collision load acting on the battery in a vehicle frontal collision. Thereby, since the battery having a high rigidity moves rearwardly when receiving the collision load from the front, it can be properly restrained that the battery hinders deformation of the vehicle-body front portion in the vehicle frontal collision. Accordingly, the proper performance of absorbing the collision load by the vehicle-body front portion can be maintained, so that the safety of passengers can be secured. Further, since the battery moving rearwardly is guided inside the tunnel portion, it can be securely prevented that the battery comes into the vehicle-inside space.

Herein, the battery may be mounted on a suspension support member supporting a suspension for a front wheel of the vehicle via a slide-mount mechanism which allows the battery to move rearwardly relative to the suspension support member. In this case, since the suspension support member is used and therefore it is unnecessary to provide any other support member to mount the battery additionally, any increase of the number of parts can be restrained.

According to another embodiment of the present invention, the battery is arranged to slant so that a rear end thereof is positioned below a front end thereof in a vehicle vertical direction. Thereby, the rearward move of the battery can be securely achieved by utilizing the own weight of the battery when receiving the collision load from the front.

According to another embodiment of the present invention, the electric motor is arranged in front of the battery so that at least part of the electric motor overlaps with the battery in an elevation view, and the electric motor is provided at a vehicle-body member attached to the vehicle so that the electric motor is movable rearwardly below the battery when receiving a rearward collision load in a vehicle frontal collision. Thereby, it can be avoided that the rearward move of the electric motor is hindered by its interfering with the battery. Accordingly, it can be properly restrained that the electric motor hinders deformation of the vehicle-body front portion when the collision load is applied from the front. Consequently, the proper performance of absorbing the collision load by the vehicle-body front portion can be maintained, so that the safety of passengers can be secured.

According to another embodiment of the present invention, the battery is arranged to slant so that a front end thereof is positioned above a rear end thereof in a vehicle vertical direction. Thereby, the electric motor which moves rearwardly when receiving the collision load from the front can be properly guided into a space below the front end portion of the battery, without arranging the whole of battery in a high position.

According to another embodiment of the present invention, the battery arrangement structure of a vehicle further comprises a sub frame provided in front of the dash panel, the sub frame being configured to deform when receiving the rearward collision load in the vehicle frontal collision, wherein the electric motor is mounted on the sub frame so that the electric motor is movable rearwardly below the battery in accordance with deformation of the sub frame. Thereby, it can be prevented by the rearward move of the electric motor that the deformation of the sub frame is hindered, so that the collision load can be efficiently absorbed by the sub frame.

According to another embodiment of the present invention, the electric motor and the sub frame are connected via a connection portion, and the connection portion comprises a releasing mechanism to release connection between the electric motor and the sub frame when receiving the rearward collision load in the vehicle frontal collision. Thereby, the electric motor can be easily and securely moved below the battery.

According to another embodiment of the present invention, the battery arrangement structure of a vehicle further comprises a drive shaft provided in a space between the electric motor and the battery, which extends in the vehicle width direction and is coupled to drive the front wheel, wherein the electric motor is coupled to the drive shaft via a shaft connection portion and configured to rotate around the drive shaft when receiving the rearward collision load in the vehicle frontal collision so that the electric motor is movable rearwardly below the battery. Thereby, the rearward move of the electric motor can be achieved, keeping coupling of the electric motor to the drive shaft.

According to another embodiment of the present invention, a restriction portion to restrict a rearward move of the drive shaft to avoid interference of the drive shaft with the battery is provided in back of the drive shaft. Thereby, since the rearward move of the drive shaft is restricted even when receiving the collision load from the front, it can be avoided that the drive shaft interferes with the battery arranged in back of the drive shaft. Accordingly, the rotation of the electric motor around the drive shaft can be achieved securely.

According to another embodiment of the present invention, the electric motor is an in-wheel type of motor which is directly connected to the front wheel of the vehicle. Accordingly, since the drive force from the electric motor is directly transmitted to the front wheel, the above-described drive shaft can be omitted. Thereby, the flexibility of arrangement of the battery in the space in front of the dash panel can improve, so that the appropriate weight balance of the vehicle between the front and rear wheels can be achieved further properly.

Other features, aspects, and advantages of the present invention will become apparent from the following description which refers to the accompanying drawings.

DETAILED DESCRIPTION OF THE INVENTION

Hereinafter, preferred embodiments of the present invention will be described referring to the accompanying drawings.

Embodiment 1

Figure 1:
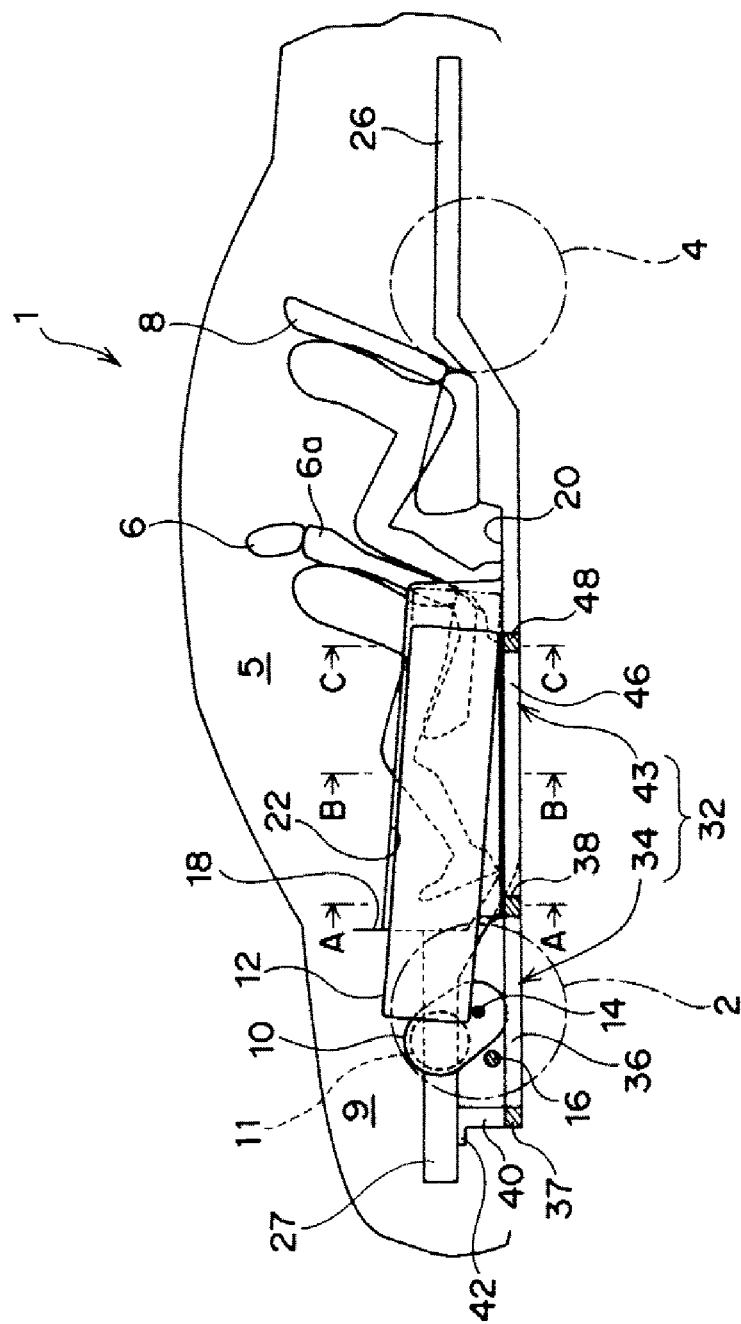
FIG. 1 is a side view of a vehicle equipped with a battery arrangement structure according to a first embodiment.
Figure 2:
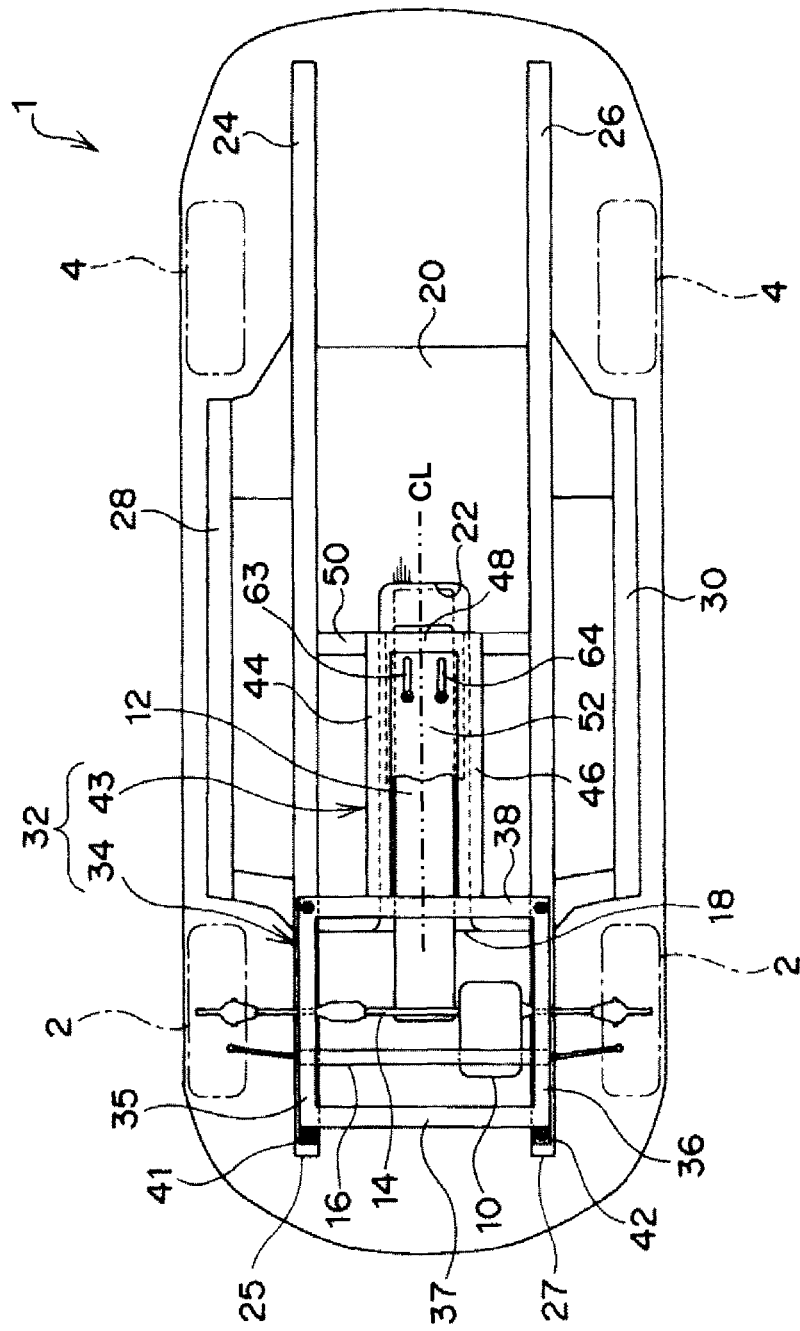
FIG. 2 is a bottom view of the vehicle shown in FIG. 1.
Figure 3:
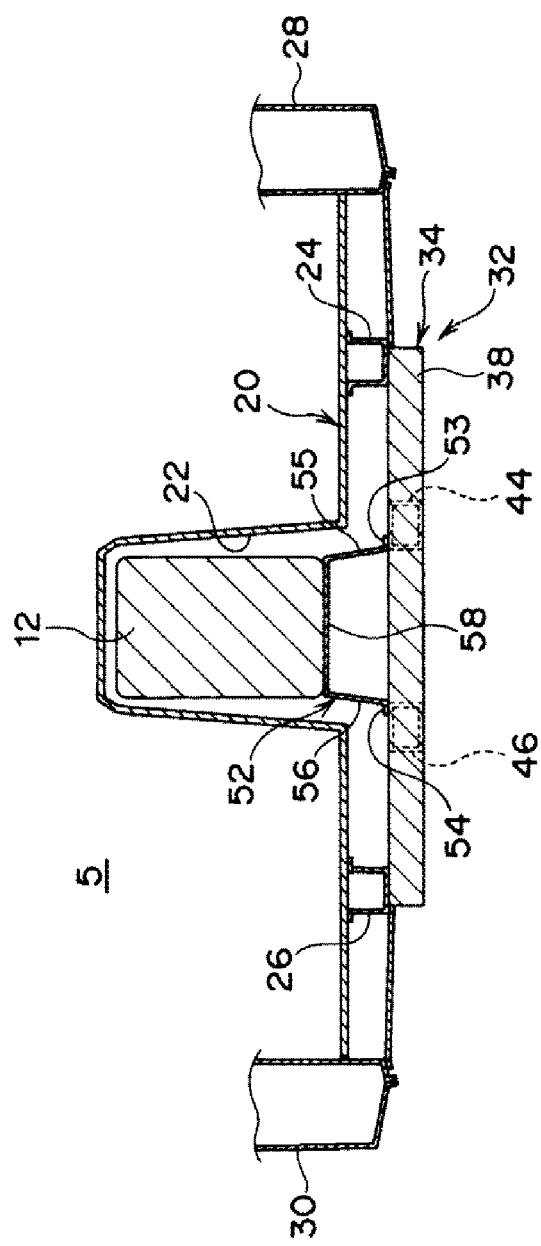
FIG. 3 is a sectional view taken along line A-A of FIG. 1.
Figure 4:
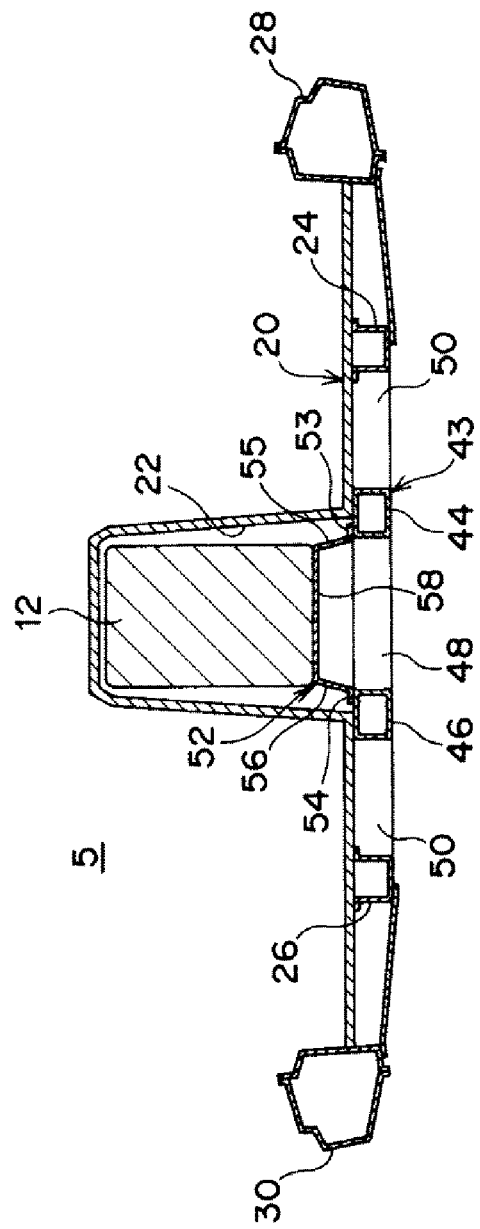
FIG. 4 is a sectional view taken along line B-B of FIG. 1.
Figure 5:
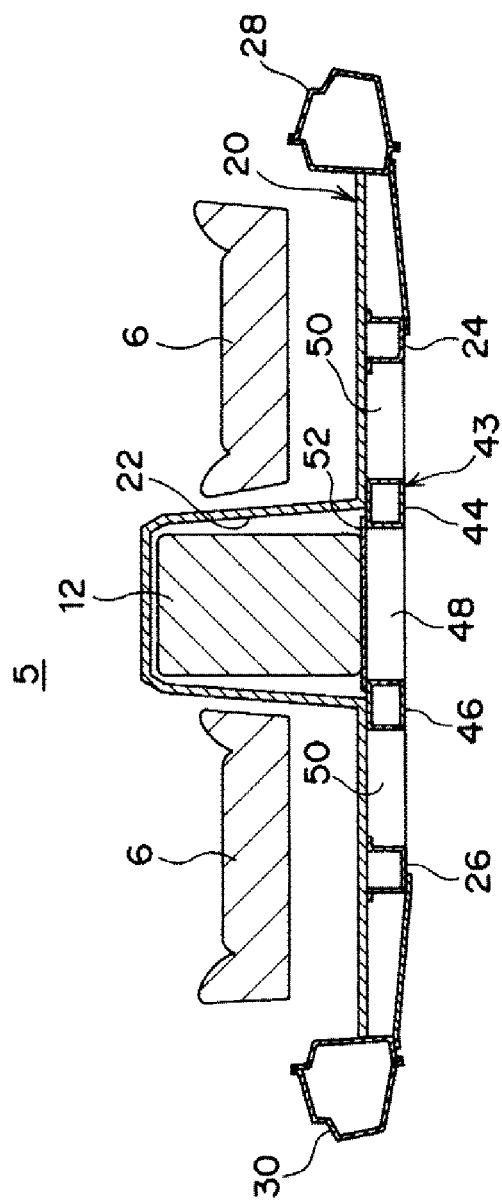
FIG. 5 is a sectional view taken along line C-C of FIG. 1.

FIG. 1 of a side view and FIG. 2 of a bottom view show a vehicle 1 equipped with a battery arrangement structure according to a first embodiment. Herein, an illustration of part of a base 52, which will be described later, is omitted in FIG. 2. FIGS. 3-5 are sectional views taken along lines A-A, B-B and C-C of FIG. 1, respectively.

As shown in FIGS. 1 and 2, the vehicle 1 is an electric vehicle which comprises an electric motor 11 to drive front wheels and a battery 12 to supply an electric power to the electric motor 11.

A pair of side sills 28, 30 is provided at both sides of the vehicle 1 so as to extend in a vehicle longitudinal direction. Further, a pair of side frames 24, 26 is provided on inward sides of the pair of side sills 28, 30 so as to extend in the vehicle longitudinal direction. Front portions of the side frames 24, 26 which are located in front of a dash panel 18, which will be described later, constitute front side frames 25, 27.

As shown in FIG. 3, the side frames 24, 26 are made of, for example, a steel member having a U-shaped cross section with an open upwardly, respectively. A floor panel 20 is supported on the side frames 24, 26, which extends between the both side sills 28, 30 so as to partition a vehicle-inside space 5 from a lower space positioned below this vehicle-inside space 5.

Returning to FIG. 1, a front seat 6 and a rear seat 8 behind the font seat 6 are provided on the floor panel 20.

Further, the dash panel 18, which partitions the vehicle-inside space 5 from a vehicle-front side space 9 located in front of the vehicle-inside space 5, is provided at a front end portion of the floor panel 20. At a central portion, in a vehicle width direction, of the floor panel 20 is provided a tunnel portion 22 which projects upwardly and extends in the vehicle longitudinal direction so as to have its longitudinal substantially-straight center line CL (see FIG. 2). This tunnel portion 22 extends rearwardly from the dash panel 18 to a specified position beside a lower end of a seatback 6a of the front seat 6. Thus, since the tunnel portion 22 is provided so as not to project rearwardly beyond the front seat 6, a foot space for a passenger seated in the rear seat 8 is not restricted, so that the proper conformability of the passenger seated in the rear seat 8 can be obtained. Further, the tunnel portion 22 is arranged so that its upper face slants downwardly and rearwardly.

The electric motor 11 is provided at a motor unit 10 arranged in the space 9 in front of the dash panel 18 of the vehicle 1. The motor unit 10 further comprises a differential device and gears, not illustrated, which transmit a drive force of the electric motor 11 to a drive shaft 14, which will be described later. Herein, the electric motor may be comprised of two motors which are provided separately for both of the front wheels. In this case, it is unnecessary to provide the differential device and gears at the motor unit 10, and it is preferable that these two motors be arranged on both sides of the battery 12.

The drive shaft 14 which connects the motor unit 10 and the front wheels 2 is arranged in the vehicle width direction in the above-described space 9. Further, a steering shaft 16 which is connected to front wheels 2 is arranged in the vehicle width direction in the space 9. In the present embodiment, the steering shaft 16 is arranged in front of the drive shaft 14, and the motor unit 10 is arranged to slant so that its front end is positioned above its rear end to avoid any interference with the steering shaft 16.

Figure 6:
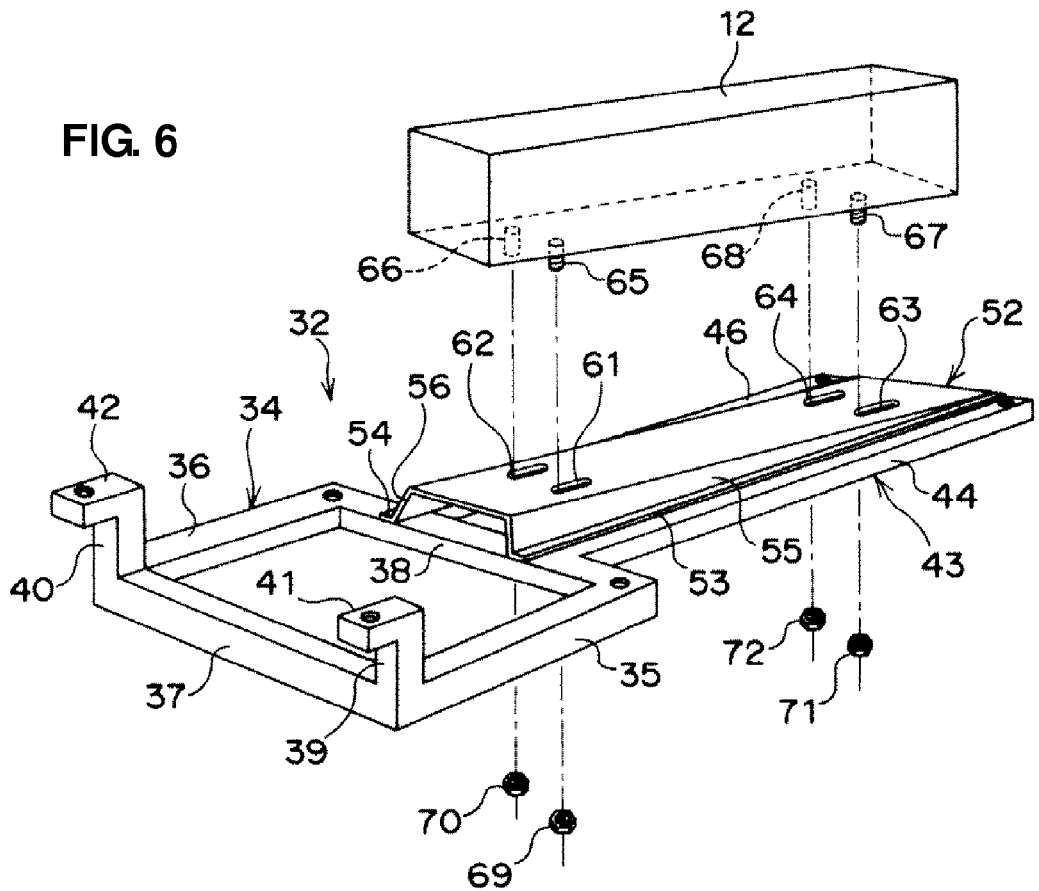
FIG. 6 is an exploded perspective view showing an attachment state of a battery to a suspension support member.

The above-described battery 12 has a longitudinally slender shape, and is arranged in the vehicle longitudinal direction at a specified position, in the vehicle width direction, which is located on the above-described longitudinal substantially-straight center line CL of the tunnel portion 12 (see FIG. 2). As shown in FIG. 6, plural bolts 65-68 project from a lower face of the battery 12, and the battery 12 is mounted on a suspension support member 32 which supports a suspension for front wheels (not illustrated).

The suspension support member 32 comprises a sub frame 34 to support the suspension for front wheels and a battery support portion 43 to support the battery 12, where are formed integrally as a unit.

The sub frame 34, which is a so-called perimeter frame having a frame shape in a plan view, comprises a pair of longitudinal members 35, 36 which extends longitudinally and a pair of lateral members 37, 38 which extends laterally between the longitudinal members 35, 36. The sub frame 34 further comprises a pair of rise portions 39, 40 which rise from both-side end portions of the lateral member 37, and a pair of connection portions 41, 42 which extend forwardly from upper ends of the rise portions 39, 40. The sub frame 34 is fixed to lower faces of the front side frames 25, 27 at the connection portions 41, 42 and the both-side end portions of the rear lateral member 38 via bolts or the like. While the sub frame 34 is made of a steel member having a closed cross section in the present embodiment, it may be made of a steel member having a U-shaped cross section.

Meanwhile, the battery support portion 43 extends rearwardly from the sub frame 34 and is arranged below the floor panel 20. The battery support portion 43 comprises a pair of longitudinal members 44, 46 which extends rearwardly from the rear lateral member 38 of the sub frame 34 and a lateral member 48 (see FIGS. 1 and 2) which extends in the vehicle width direction between the longitudinal members 44, 46. These members 44, 46 and 48 are made of a steel member having a closed cross section, for example. A rear end portion of the battery support portion 43 is connected to the side frames 24, 26 via a cross member 50 which extends in the vehicle width direction (see FIG. 2).

The battery support portion 43 has the base 52 to mount the battery 12 at its upper face. The base 52 is made of a metal plate, for example. The base 52 comprises a pair of base portions 53, 54 which extend longitudinally, a pair of rise portions 55, 56 which rise from inward end portions of the base portions 53, 54, and an upper face portion 58 which extends between upper end portions of the rise portions 55, 56.

The left base portion 53 is fixed to an upper face of the left longitudinal member 44 of the battery support portion 43, and the right base portion 54 is fixed to an upper face of the right longitudinal member 45 of the battery support portion 43, respectively, by welding, for example.

The rise portions 55, 56 are formed so that its upper face portion 58 slants downwardly and rearwardly. A slant angle of this upper face portion 58 is equal to a slant angle of the upper face of the above-described tunnel portion 22, so that the height from the upper face portion 58 and the top face of the tunnel portion 22 is substantially constant over a whole longitudinal length of the tunnel portion 22 as shown in FIGS. 3 through 5.

Figure 7:
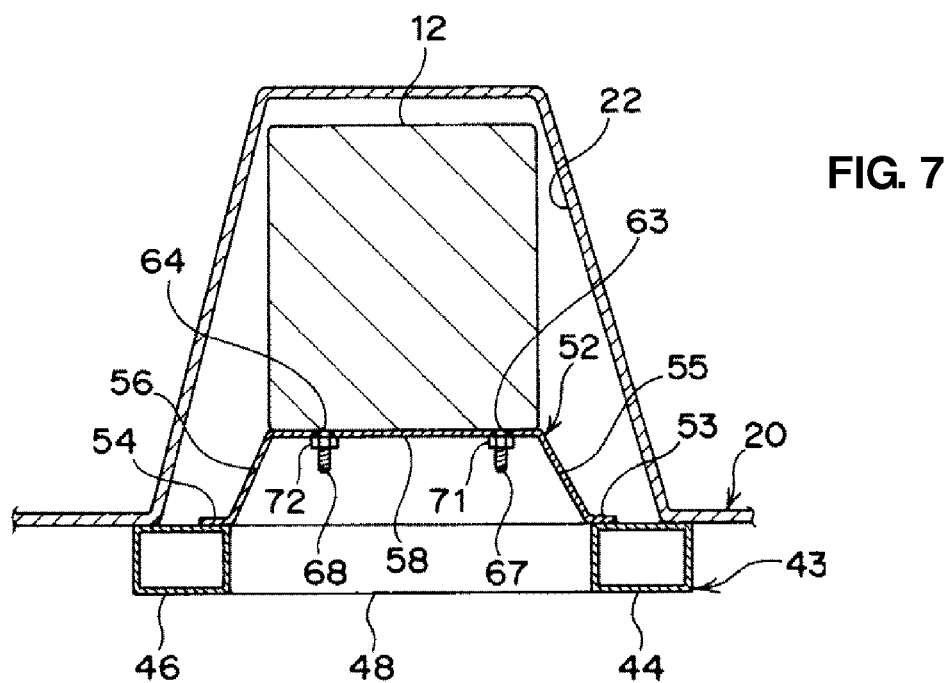
FIG. 7 is an enlarged sectional view showing the attachment state shown in FIG. 6.

On the upper face portion 58 of the base 52 are formed through holes 61-64 for the above-described bolts 65-68 fixed to the lower face of the battery 12. As shown in FIGS. 6 and 7, in case the battery 12 is installed on the base 52, the bolts 65-68 fixed to the lower face of the battery 12 are inserted into the respective through holes 61-64 formed at the base 52 from above, and then nuts 69-72 are fastened to the bolts 65-68, respectively, from below.

Each of the through holes 61-64 is comprised of a slot which has a longitudinally-elongated shape. Thereby, the bolts 65-68 are arranged so as to slide in the through holes 61-64 in the vehicle longitudinal direction. Thus, when the vehicle 1 receives the collision load from the vehicle front in a state in which the battery 12 is mounted on the base 52, the bolts 65-68 can move rearwardly in the through holes 61-64.

As shown in FIG. 1, the battery 12 mounted on the suspension support member 32 is arranged so that at least its front-side portion is positioned in front of the dash panel 18 in the vehicle longitudinal direction, specifically, the battery 12 is arranged so that the front-side part of the battery 12 is positioned in front of the dash panel 18 and the rear-side part of the battery 12 is positioned inside of the tunnel portion 12. Thereby, the flexibility of the weight balance of the vehicle between the front wheels 2 and the rear wheels 4 can be secured, so that the appropriate longitudinal weight balance, such as 6:4, can be obtained. Accordingly, the proper traveling stability and maneuverability of the vehicle 1 can be obtained. Further, the battery is arranged so that its front end is positioned above the drive shaft 14. Thereby, the battery 12 can be positioned as forwardly as possible, avoiding any interference of the battery 12 with the drive shaft 14, so that the battery volume can be enlarged as well. Herein, while the battery 12 of the present embodiment has the almost constant cross section over its whole length from its front end portion to its rear end portion, a shape of the front end portion of the battery 12 may be changed partially from its other portion so as to avoid the dive shaft 14 upwardly.

Further, the battery 12 is stored inside the tunnel portion 22 at its rear-side part. Thus, by arranging the battery 12 so that its front-side part is positioned in front of the dash panel 18 and its rear-side part is positioned inside of the tunnel portion 22 in the vehicle longitudinal direction, the floor panel 20 can be restrained from rising upwardly too much, so that the volume of the battery 12 can be enlarged, without narrowing the vehicle-inside space 5.

Moreover, the battery 12 is arranged so as to form a specified space behind the battery 12 inside the tunnel portion 22. Thus, when the vehicle 1 receives the collision load from the front, the battery 12 can move rearwardly inside the tunnel portion 22 to a rear position shown by a two-dotted broken line in FIGS. 1 and 2. That is, it can be avoided that the rearward move of the battery 12 is hindered by a rear wall of the tunnel portion 22 or that the battery moving rearwardly comes into the vehicle-inside space 5 in back of the tunnel portion 22. Further, since the front-side part of the battery 12 positioned in front of the dash panel 18 is guided in the tunnel portion 22 when receiving the collision load from the front, it can be securely prevented that the battery 12 comes into the vehicle-inside space 5.

The battery 12 is arranged to slant so that its rear end is positioned below its front end. Thereby, the rearward move of the battery 12 can be securely achieved by utilizing the own weight of the battery 12 when receiving the collision load from the front. Moreover, since the slant angle of this battery 12 is equal to the slant angle of the upper face of the tunnel portion 22, the battery 12 moving rearwardly can be securely guided in the tunnel portion 22.

As described above, since the battery 12 having a high rigidity moves rearwardly when receiving the collision load from the front, it can be properly restrained that the battery 12 hinders deformation of the vehicle-body front portion in the vehicle frontal collision. Accordingly, the proper performance of absorbing the collision load by the vehicle-body front portion can be maintained, so that the safety of passengers can be secured.

Moreover, as shown in FIG. 2, the electric motor 10 is arranged in the space 9 in front of the dash panel 18 so that its rear end portion overlaps with the battery 12 in the vehicle longitudinal direction. Thereby, the electric motor 10 can be arranged properly by using a space beside the front-side part of the battery 12 positioned in front of the dash panel 18.

While the battery 12 is movable rearwardly by mounting the battery 12 on the suspension support member 32 via the slots 61-64 of the base 52 according to the first embodiment, the movably-mounting mechanism of the battery 12 should not be limited to the above-described one. For example, the battery 12 may be fixed onto the suspension support member 32 by bolts which are breakable when the battery 12 receives a specified amount of the collision load from the front, so that the battery can move rearwardly when the bolts get broken. In this case, it may be preferable that some guide rails to guide the battery 12 rearwardly in the tunnel portion 22 be provided between the battery 12 and the suspension support member 32.

Figure 8:
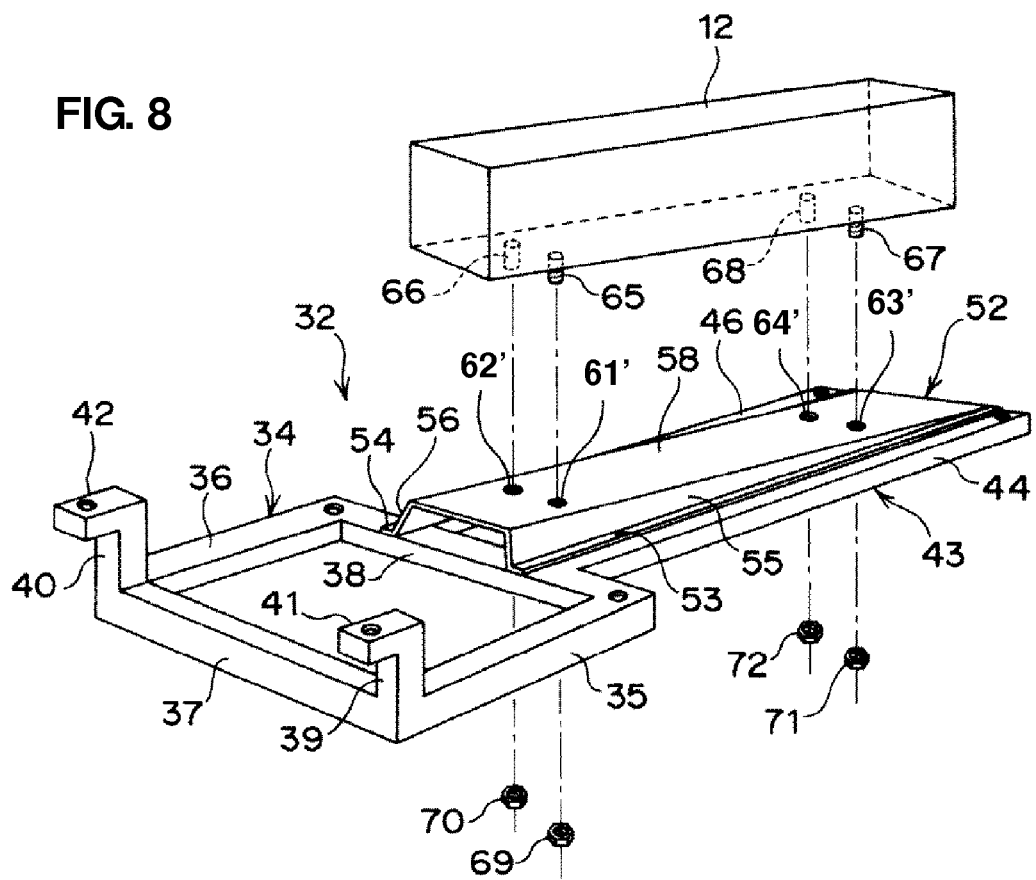
FIG. 8 is an exploded perspective view showing a modification of the attachment state of the battery to the suspension support member.

Further, in place of the above-described rearwardly-movable attachment of the battery 12 to the suspension support member 12, its modification shown in FIG. 8 may be applied. Herein, normal circular bolt through holes 61'-64' are formed on the upper face portion 58 of the base 52, instead of the above-described slots 61-64, so that the battery 12 can be firmly fixed onto the upper face portion 58 of the base 52 without being movable rearwardly.

Figure 9:
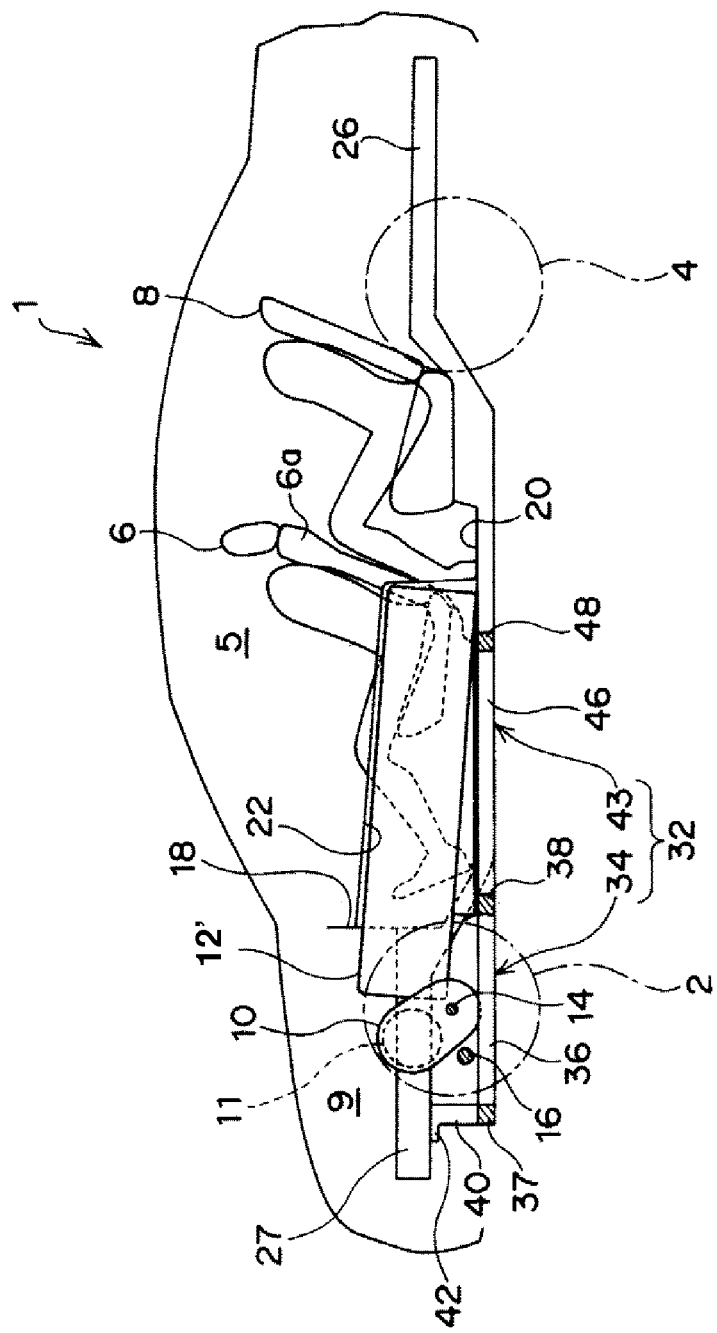
FIG. 9 is a side view showing a modification of the battery arrangement structure of the vehicle.

Moreover, according to further another modification, a battery 12' may be arranged so that its front end is positioned right behind the drive shaft 14 as shown in FIG. 9, in place of the arrangement of the battery 12 shown in FIG. 1 in which the battery 12 is arranged so that its front end is positioned above the drive shaft 14. Thereby, the battery 12' of this modification can be positioned as forwardly as possible, avoiding any interference of the battery 12 with the drive shaft 14, so that the battery volume can be enlarged.

Embodiment 2

Figure 10:
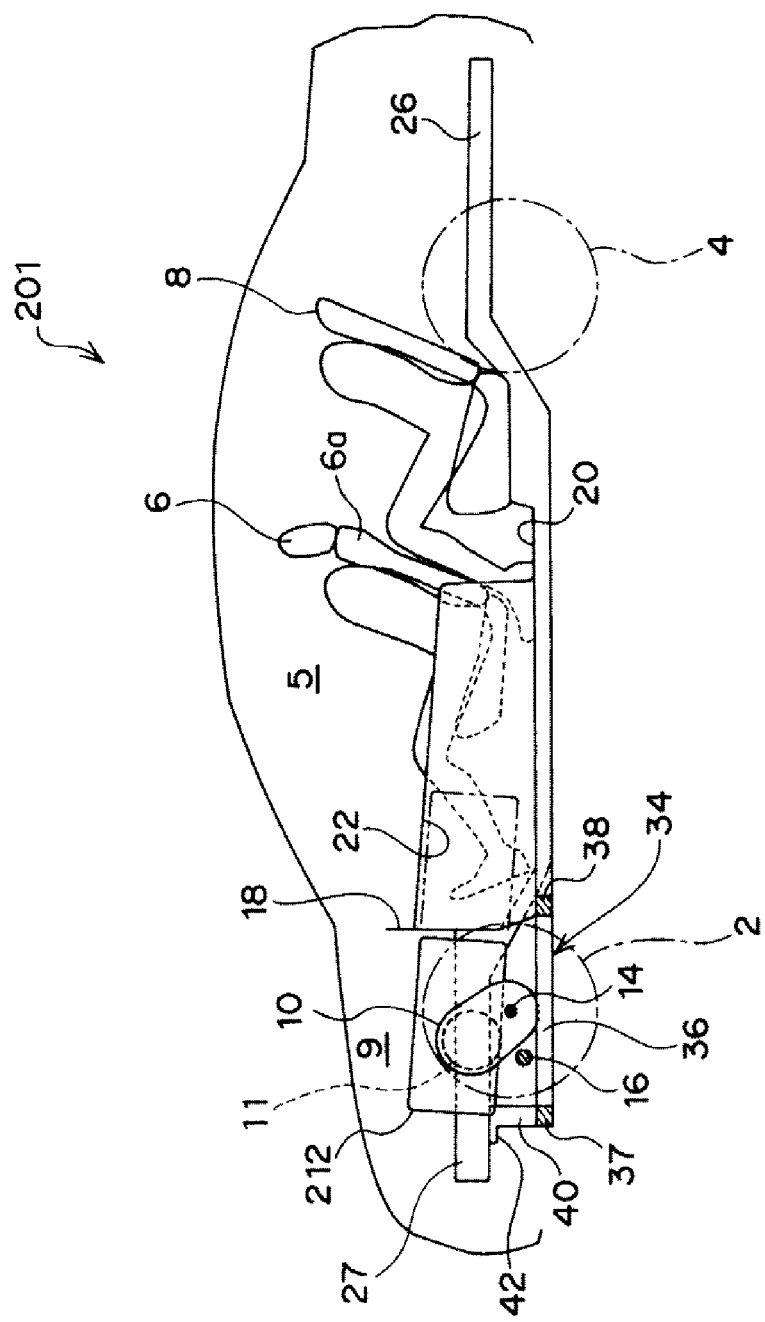
FIG. 10 is a side view of a vehicle equipped with a battery arrangement structure according to a second embodiment.
Figure 11:
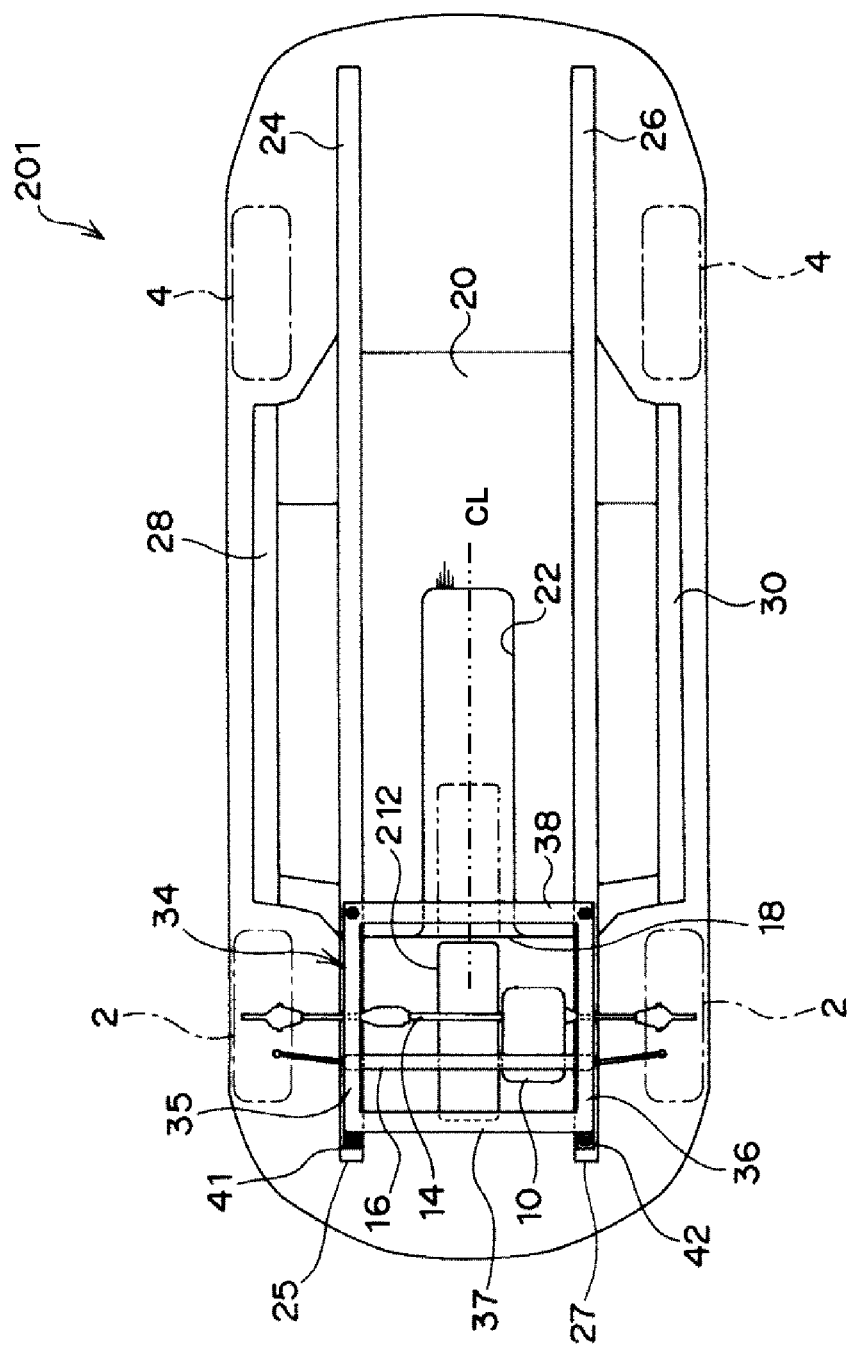
FIG. 11 is a bottom view of the vehicle shown in FIG. 10.

FIG. 10 of a side view and FIG. 11 of a bottom view show a vehicle 201 equipped with a battery arrangement structure according to a second embodiment.

In the second embodiment, as shown in FIGS. 10 and 11, a battery 212 is arranged so that a whole part the battery 212 to supply the electric power to the electric motor 10 is positioned in front of the dash panel 18 outside of the tunnel portion 22. The battery 212 is provided so as to move rearwardly in the tunnel portion 22 in accordance with the rearward collision load acting in the vehicle frontal collision. Thereby, like the above-described first embodiment, it can be avoided that the proper performance of absorbing the collision load by the vehicle-body front portion is hindered by the battery 212, and it can be prevented that the battery 212 moving rearwardly comes into the vehicle-inside space 5. Herein, two-dotted broken line in FIGS. 10 and 11 show an exemplified position of the battery 212 after it moves rearwardly.

The battery 212 is arranged to slant so that its rear end portion is positioned below its front end portion. This slant angle of the battery 212 is equal to the slant angle of the upper face of the tunnel portion 22. Thereby, the rearward move of the battery 212 into the tunnel portion 22 can be securely achieved by utilizing the own weight of the battery 212 when receiving the collision load from the front.

In the second embodiment, the support structure of the battery 212 should not be limited to the above-described one. For example, the battery 212 may be fixed to the suspension support member 32 via a specified member, and the battery 212 may be configured to move rearwardly in case bolts for fixing the battery 212 get broken when receiving the collision load from the front.

The other structures of the second embodiment are substantially the same as those of the first embodiment, and components which perform the same functions as those of the first embodiment are denoted by the same reference characters in FIGS. 10 and 11.

Embodiment 3

Figure 12:
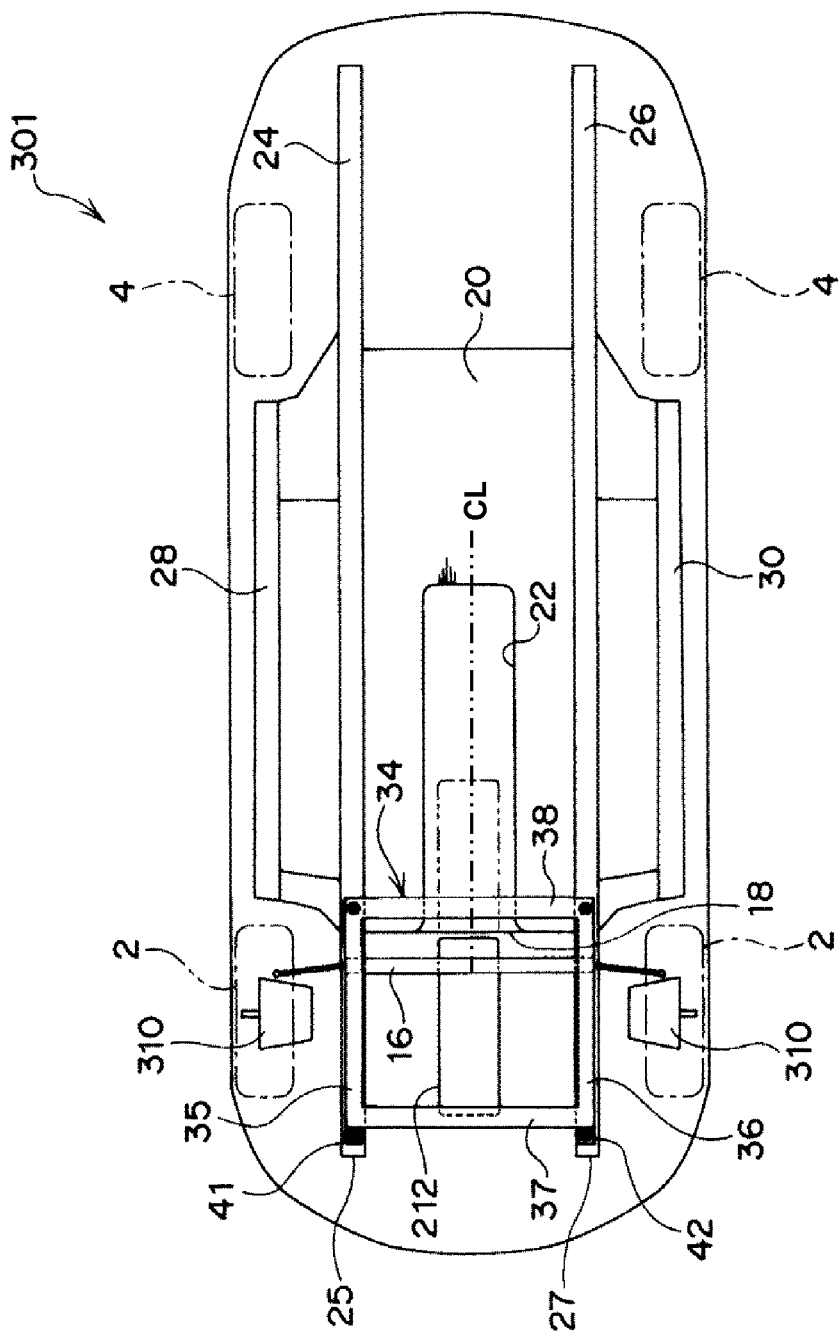
FIG. 12 is a bottom view of a vehicle equipped with a battery arrangement structure according to a third embodiment.

FIG. 12 of a bottom view shows a vehicle 301 equipped with a battery arrangement structure according to a third embodiment.

In the third embodiment, as shown in FIG. 12, the structure of an electric motor 310 to drive the front wheels 2 is different from that of the electric motor 10 of the first or second embodiments, and the other structures are substantially the same as those of the second embodiment. That is, the battery 212 is arranged so as to move rearwardly into the tunnel portion 22 in accordance with the collision load as well. In FIG. 12, a two-dotted broken line shows an exemplified position of the battery 212 after it moving rearwardly, and components which perform the same functions as those of the first or second embodiment are denoted by the same reference characters.

The electric motors 310 of the present embodiment are an in-wheel type of motor, which are directly connected to the right and left front wheels 2, respectively. Accordingly, since the drive force from the electric motor 310 is directly transmitted to the front wheels 2, the drive shaft 14 of the first or second embodiments can be omitted. Thereby, the flexibility of arrangement of the battery 212 in the space 9 in front of the dash panel 18 can improve, so that the appropriate weight balance of the vehicle between the front and rear wheels can be achieved further properly.

Herein, the battery used in the third embodiment should not be limited to the battery 211 of the second embodiment, and the battery 12 of the first embodiment may be applied.

Embodiment 4

A battery arrangement structure of a vehicle 401 according to a fourth embodiment will be described referring to FIGS. 13 through 18. The same structures of the fourth embodiment are denoted by the same reference characters, specific descriptions of which are omitted here. In the fourth embodiment, an electric motor 411 is arranged in front of the battery 12 so that at least part of the electric motor 411 overlaps with the battery 12 in an elevation view, and the electric motor 411 is provided at a sub frame 434 as a vehicle-body member attached to the vehicle so that the electric motor 411 can move rearwardly below the battery 12 when receiving the rearward collision load in the vehicle frontal collision.

Figure 13:
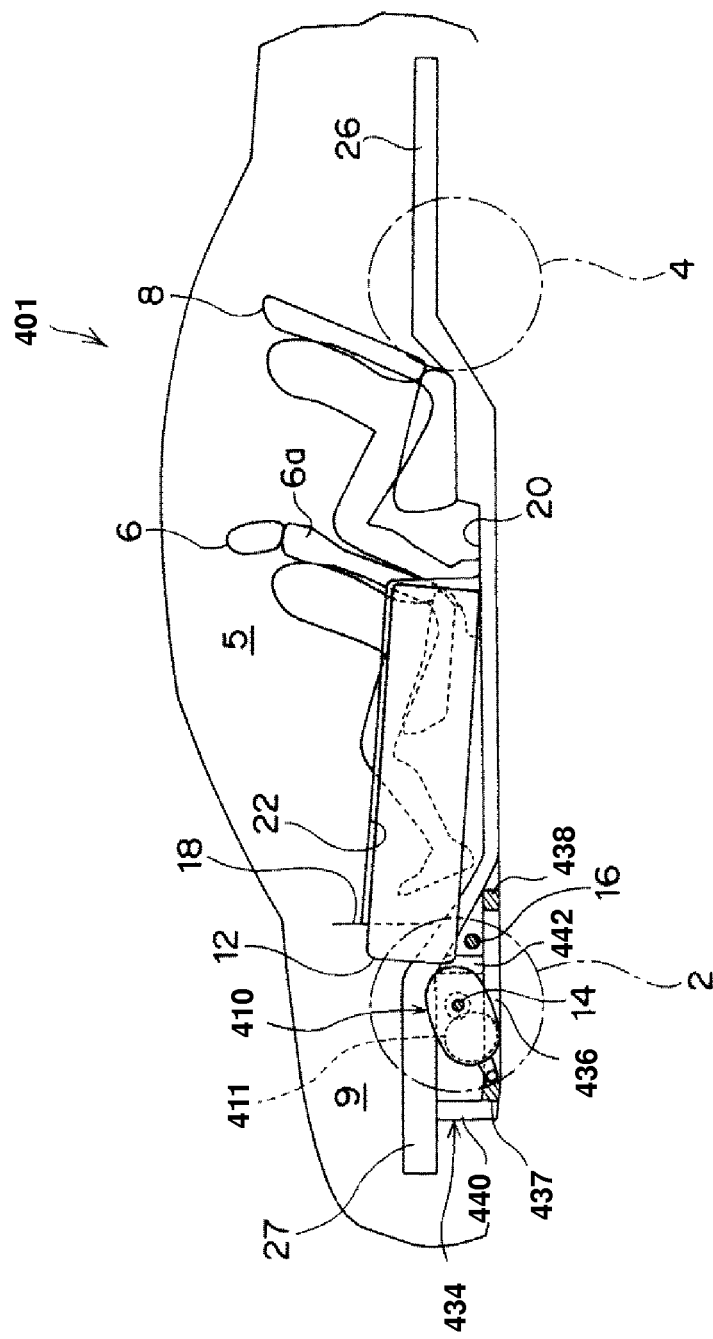
FIG. 13 is a side view of a vehicle equipped with a battery arrangement structure according to a fourth embodiment.
Figure 14:
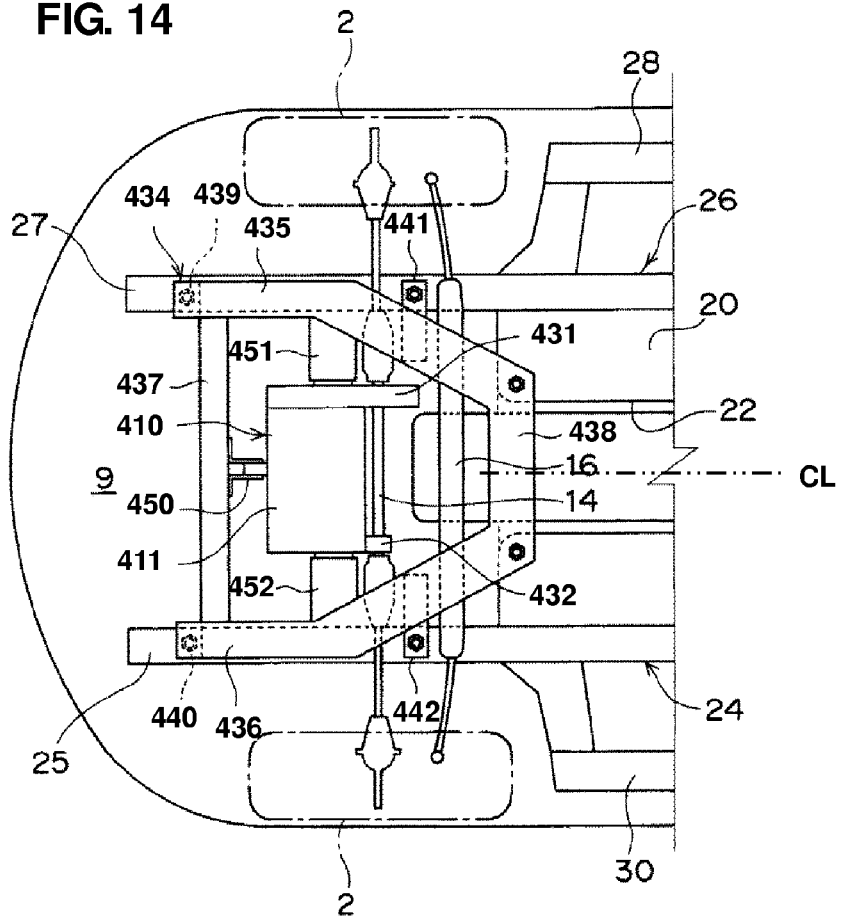
FIG. 14 is an enlarged bottom view of a vehicle-body front portion of the vehicle shown in FIG. 13.

As shown in FIGS. 13 and 14, the sub frame 434 which supports the suspension for front wheels (not illustrated) and is the so-called perimeter frame having the frame shape in the plan view, comprises a pair of longitudinal members 435, 436 which extends longitudinally and a pair of lateral members 437, 438 which extends laterally between the longitudinal members 435, 436. The longitudinal members 435, 436 curve at their central portions, extend rearwardly straightly from their front end portions to their central portions, and extend obliquely rearwardly and inwardly from their central portions to their rear end portions.

The sub frame 434 further comprises a pair of front rise portions 439, 440 which rise from front end portions of the longitudinal members 439, 440, and a pair of rear rise portions 441, 442 which rise from slightly rearward positions of the central portions of the longitudinal members 435, 436. The sub frame 434 is fixed to lower faces of the front side frames 25, 27 at upper end portions of the front rise portions 439, 440 and upper end portions of the rear rise portions 441, 442 via bolts or the like. Further, the sub frame 434 is fixed to the lower face of the floor panel 20 at both-side end portions of the rear lateral member 438.

The both rear rise portions 441, 442 are arranged at a specified position in back of the drive shaft 14 which can restrict the rearward move of the drive shaft 14 so that the drive shaft 14 moving rearwardly does not interfere with the battery 12. Thus, the rear rise portions 441, 442 perform a function of a restricting portion to restrict the rearward move of the drive shaft 14 when receiving the collision load from the front.

Figure 18:
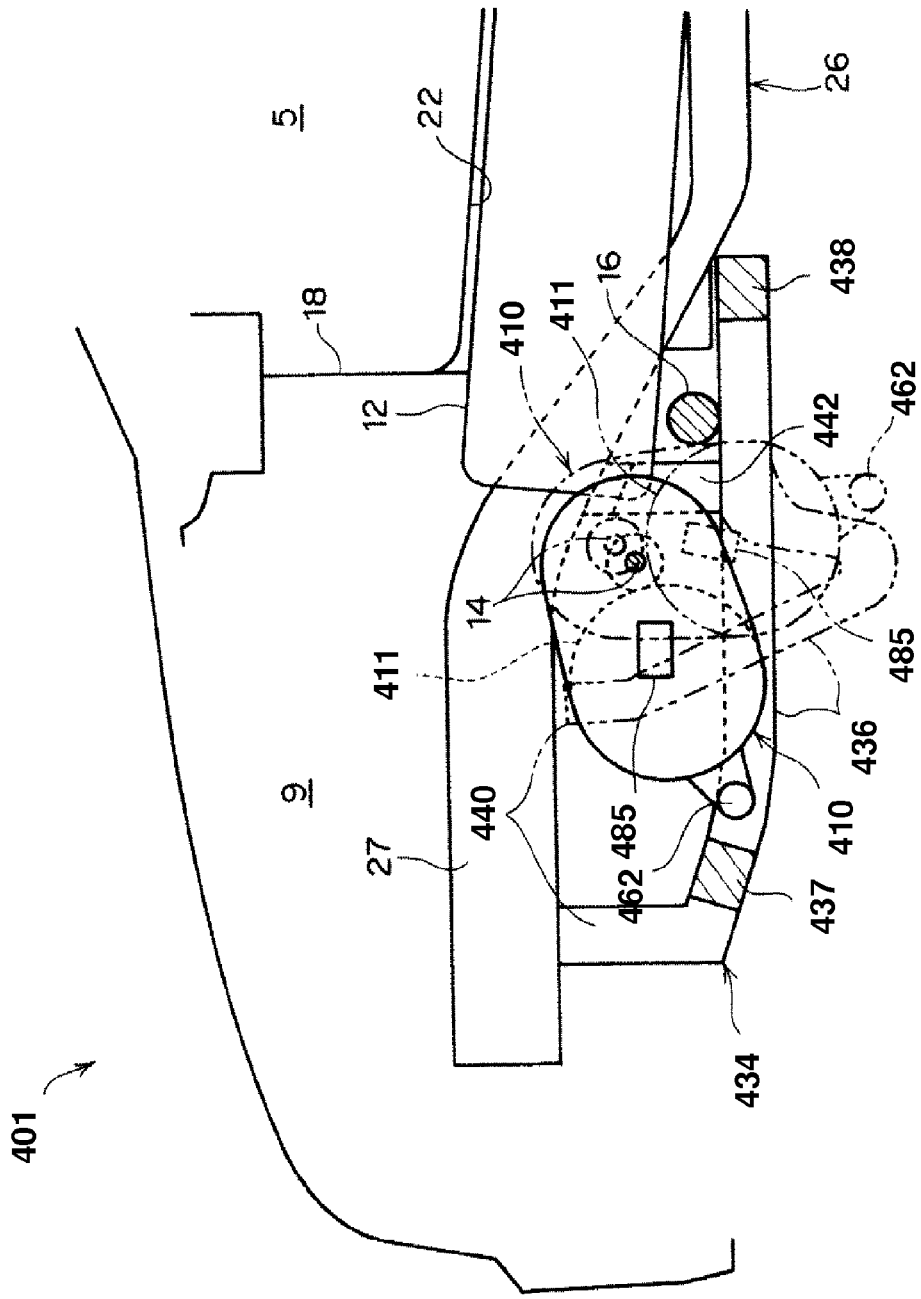
FIG. 18 is an enlarged sectional view of the vehicle-body front portion of the vehicle shown in FIG. 13.

The above-described sub frame 434 is designed to deform as shown by a two-dotted broken line in FIG. 18, for example, when receiving the collision load of a specified force F or greater from the front. Specifically, the front end portions of the sub frame 434 move rearwardly straightly, and the longitudinal members 435, 436 bend so that its central portion moves obliquely rearwardly and downwardly. Further, the front side frames 25, 27 also deform in accordance with the deformation of the sub frame 434, maintaining their connection with the sub frame 434, which is not illustrated in FIG. 18. Thus, the collision load from the front can be absorbed by the vehicle-body front portion, thereby restraining transmission to the vehicle-inside room. Herein, while the sub frame 434 is made of a steel member having a closed cross section in the present embodiment, it may be made of a steel member having a U-shaped cross section.

As shown in FIGS. 13 and 14, a motor unit 410 is arranged in the space 9 in front of the dash panel 18 between the front side frames 25, 27. The motor unit 410 comprises the above-described electric motor 411, a speed-reduction device 431 to transmit the drive force from the electric motor 411 to the drive shaft 14, and a support portion 432 to support the electric motor 411 at the drive shaft 14. The electric motor 411 is arranged at a central portion, in the vehicle width direction, of the vehicle body and in front of the drive shaft 14, and connected to the front wheels 2 via the speed-reduction device 431 and the drive shaft 14.

The speed-reduction device 431 is connected to a left-side end portion of the electric motor 411, for example. Further, this speed-reduction device 431 is coupled to the drive shaft 14 in back of the electric motor 411, and transmits the drive force of the electric motor 411 to the drive shaft 14 by reducing speeds. The support portion 432 projects rearwardly from a right-side end portion of the electric motor 411, for example. Further, the support portion 432 is rotatably connected to the drive shaft 14 in back of the electric motor 411. Thereby, the electric motor 411 is securely supported at the drive shaft 14 via the support portion 432. The motor unit 410 is connected to the sub frame 434 via plural connection portions 450-452, and specific connection structure between the motor unit 410 and the sub frame 434 will be described. The electric motor 411 is arranged in front of the battery 12 so that at least part of the electric motor 411 overlaps with the battery 12 in the elevation view.

Hereinafter, the connection structure of the motor unit 410 to the sub frame 434 will be described specifically.

Figure 15:
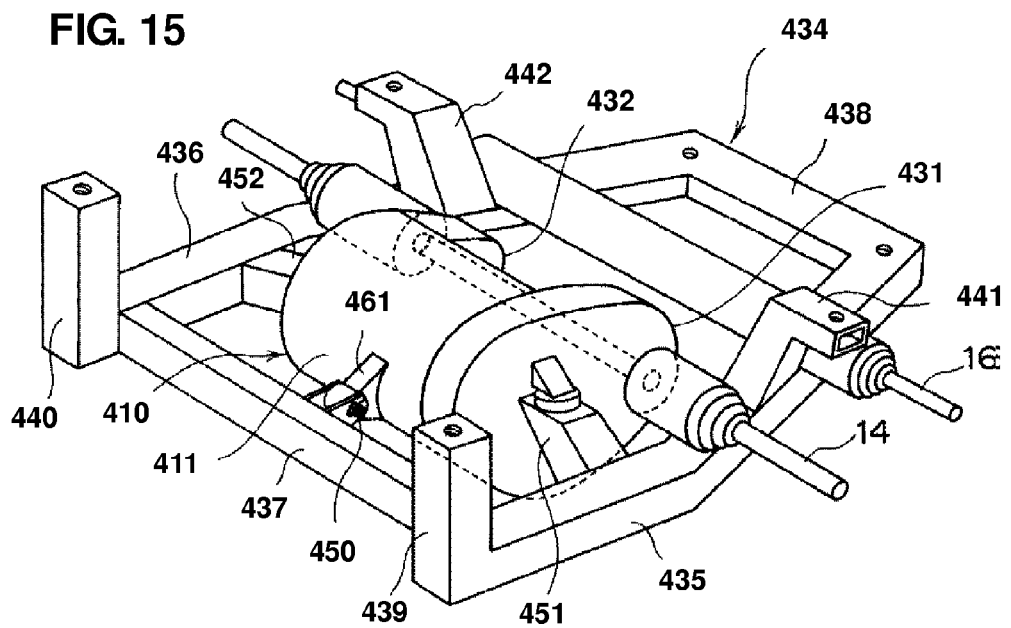
FIG. 15 is a perspective view showing a motor unit provided at the vehicle-body front portion of the vehicle shown in FIG. 13 and its surrounding members.

As shown in FIG. 15, the motor unit 410 is connected to the front lateral member 437 of the sub frame 434 via the front connection portion 450 and connected to the longitudinal members 435, 436 of the sub frame 434 via the side connection portions 451, 452.

Figure 16:
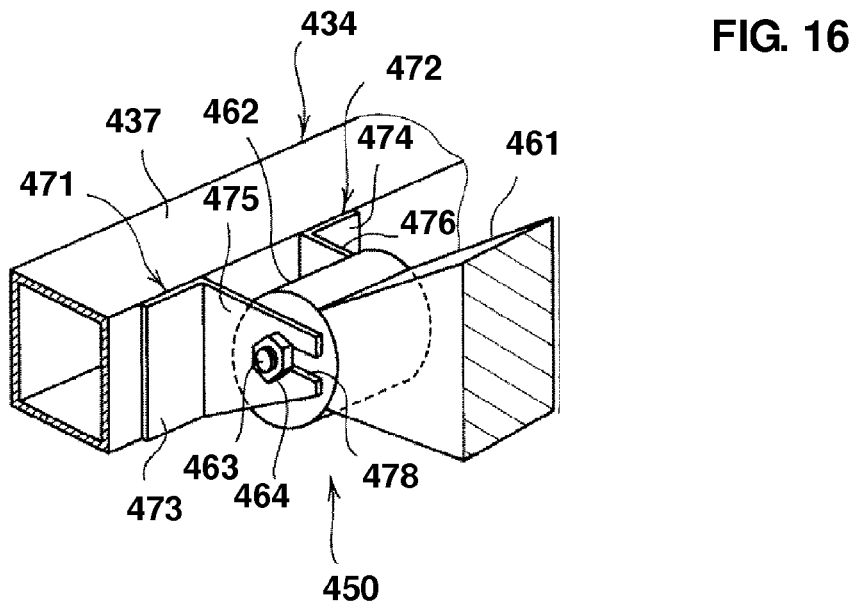
FIG. 16 is a perspective view showing an attachment state of a front portion of the motor unit shown in FIG. 15.

As shown in FIG. 16, the front connection portion 450 comprises a pair of support plates 471, 472 which is attached to the front lateral member 437 and a projection portion 461 which projects forwardly from a front face of the electric motor 411. A tip portion 462 of the projection portion 461 is supported at the support plates 471, 472. The projection portion 461 is arranged at the central portion, in the vehicle width direction, of the vehicle body, and the support plates 471, 472 are arranged at a position corresponding to the projection portion 461. That is, the support plates 471, 472 are arranged on the both sides of the vehicle center in the vehicle width direction. The support plates 471, 472 comprise, respectively, base portions 473, 474 which are fixed to a rear face of the front lateral member 437 by welding, for example, and support portions 475, 476 which extend rearwardly from central end portions of the base portions 473, 474. The support portions 475, 476 have substantially the same width as a tip portion 462 of the projection portion 461. Further, slits 478 are formed at the support portions 475, 476 so as to extend forwardly from their rear ends.

Meanwhile, bolts 463 are provided at both side faces of the tip portion 462 of the projection portion 461 so as to extend in the vehicle width direction. The projection portion 461 is fixed to the support portions 475, 476 by fastening nuts 464 to tips of the bolts 463 inserted into the slits 478 of the support portions 475, 476. That is, the motor unit 410 is connected to the front lateral member 437 of the sub frame 434 via the front connection portion 450.

Next, the structure of the left-side side connection portion 451 of the side connection portions 451, 452 will be described referring to FIG. 17. Herein, the right-side side connection portion 452 has substantially the same structure as the left-side side connection portion 451, so its illustration and description are omitted here.

Figure 17:
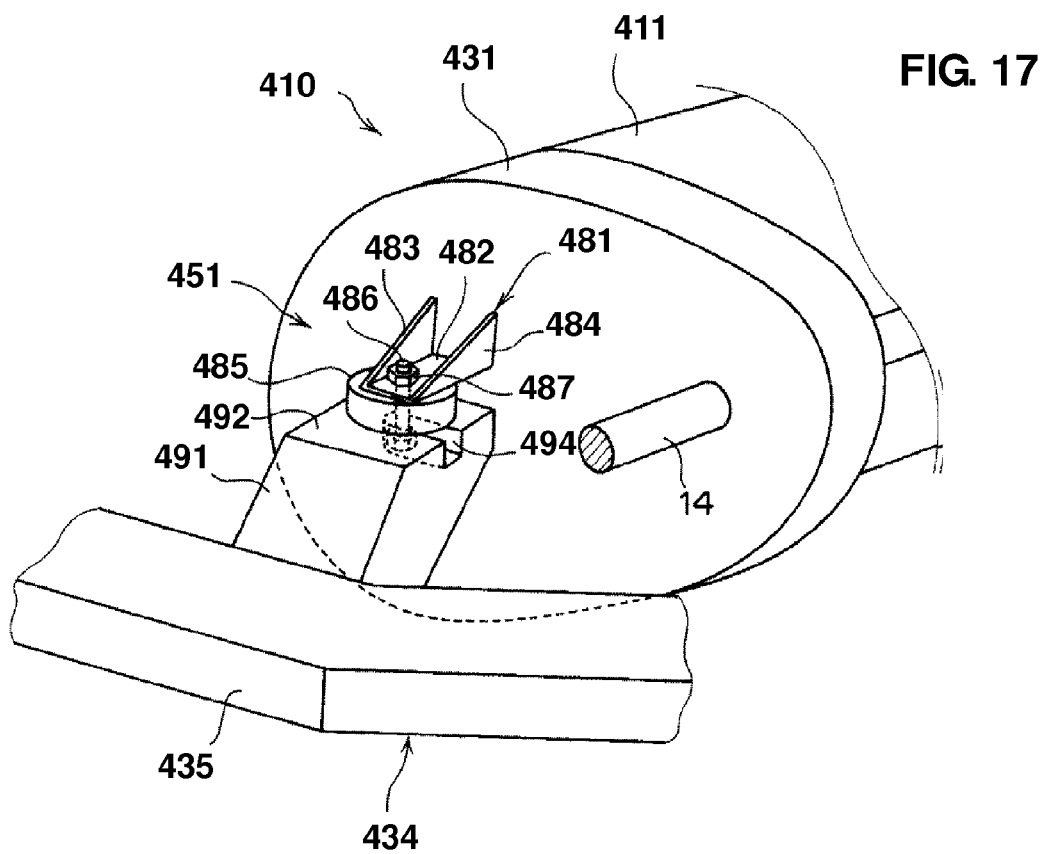
FIG. 17 is a perspective view showing an attachment state of a side portion of the motor unit shown in FIG. 15.

As shown in FIG. 17, the side connection portion 451 comprises a support arm 491 which extends inwardly from the longitudinal member 435 and a projection plate 481 which projects from an outward side face of the motor unit 410. The projection plate 481 is supported at the support arm 491 via a shock-absorbing member 485. The support arm 491 has a substantially-horizontal upper face 492 at its tip portion where a groove 492 is formed so as to extend forwardly from its rear end to its central portion.

Meanwhile, the projection plate 481 comprises a horizontal portion 482, a front rise portion 483 which rises from a front end portion of the horizontal portion 482, and a rear rise portion 484 which rises from a rear end portion of the horizontal portion 482. The shock-absorbing member 485, such as a rubber, is attached to a lower face of the horizontal portion 482 of the projection plate 481. Specifically, the shock-absorbing member 485 is fixed to the horizontal portion 482 by fastening a nut 487 to a tip of a bolt 486 which is inserted into the horizontal portion 482 and the shock-absorbing member 485 from bottom.

The projection plate 481 is placed onto the upper face 492 of the support arm 491 via the shock-absorbing member 485 in a state in which a head portion of the bolt 486 is positioned in the a front end portion of the groove 494 of the support arm 491. Thereby, the projection plate 481 is supported by the support arm 491 in a state in which its moves in all directions except the rearward direction are restricted. That is, the motor unit 410 is connected to the longitudinal members 435, 436 of the sub frame 434 via the above-described side connection portions 451, 452.

As described above, while the motor unit 410 is connected to the sub frame 434 via the plural connection portions 450-452, when the receiving the collision load of the specified force F or greater, the support plates 471, 472 of the front connection portion 450 and the groove 494 of the side connection portions 451, 452 perform a releasing mechanism so that the connection between the motor unit 410 and the sub frame 434.

Hereinafter, this release will be described specifically referring to FIG. 18. When receiving the collision load of the specified force F or greater, the sub frame 434 deforms first, and then the front lateral member 437 of the sub frame 434 deforming rearwardly pushes the front end portion of the motor unit 410 rearwardly and downwardly via the front connection portion 450. Thereby, the motor unit 410 starts rotating around the drive shaft 14 counterclockwise in FIG. 18. In accordance with this rotation of the motor unit 410, the above-described bolts 463 at the front connection portion 450 slide backwardly in the slits 478 at the support plates 471, 472 and finally fall away from the slits 478, or welding connection between the base portions 473, 474 of the support plates 471, 472 and the front lateral member 437 gets broken. Consequently, the connection of the motor unit 410 to the sub frame 434 via the front connection portion 450 is released (see FIG. 16).

Further, in case the sub frame 434 deforms, when the connection of the motor unit 410 to the sub frame 434 via the front connection portion 450 is released as described above, the motor unit 410 moves rearwardly and downwardly in accordance with the rotation around the drive shaft 14, and also the head portion of the bolt 486 engaging with the groove 494 at the support arm 491 of the side connection portions 451, 452 moves rearwardly and downwardly. Thus, the head portion of the bolt 486 falls away from the groove 494. Consequently, the connection of the motor unit 410 to the sub frame 434 via the front side connection portions 451, 452 is released.

Once the connection between the motor unit 410 and the sub frame 434 is released as described above, the rotation of the electric motor 411 around the drive shaft 14 continues smoothly to a position below the drive shaft 14. Thereby, the electric motor 411 can move below the front end portion of the battery 12 easily and securely. Herein, while the drive shaft 14 moves rearwardly slightly, this rearward move of the drive shaft 14 is restricted by the rear rise portions 441, 442 of the sub frame 434 so that the drive shaft 14 does not interfere with the battery 12. Therefore, the above-described rotation of the electric motor 411 can be achieved securely.

According to the present embodiment, since the electric motor 411 moves rearwardly below the battery 12 when receiving the collision load of the specified force F from the front, it can be avoided that the rearward move of the electric motor 411 is hindered by its interfering with the battery 12. Accordingly, it can be properly restrained that the electric motor 411 hinders the deformation of the vehicle-body front portion when the collision load is applied from the front. Consequently, the proper performance of absorbing the collision load by the vehicle-body front portion can be maintained, so that the safety of passengers can be secured.

Further, since the electric motor 411 moves rearwardly below the battery 12 in accordance with the deformation of the sub frame 434, it can be prevented by the rearward move of the electric motor 411 that the deformation of the sub frame 434 is hindered, so that the collision load can be efficiently absorbed by the sub frame 434.

Further, since the electric motor 411 is configured to rotate around the drive shaft 14 so that the electric motor 411 can move rearwardly below the battery 12, the rearward move of the electric motor 411 can be achieved, keeping coupling of the electric motor 411 to the drive shaft 14.

The present should not be limited to the above-described embodiments, and any other modifications or improvements can be applied within the scope of a sprit of the present invention.

For example, while the above-described embodiments are described about the battery to supply the electric power to the electric motor for driving the front wheels of the vehicle, the present invention is also applicable to a battery for an electric motor to drive the rear wheels of the vehicle or an electric motor to drive four wheels of a four-wheel drive vehicle.

For example, while the above-described fourth embodiments shows an example in which the electric motor is moved rearwardly below the battery by rotating the electric motor around the drive shaft, the present invention is also applicable a structure in which the connection of the electric motor to the drive shaft is released when receiving the collision load of the specified force F or greater from the front, so that the electric motor can fall down to a position below the battery.

What is claimed is:

1. A battery arrangement structure of a vehicle, comprising:
    an electric motor to drive front wheels of the vehicle;
    a battery to supply an electric power to the electric motor;
    a dash panel partitioning a vehicle-inside space from a vehicle-front side space located in front of the vehicle-inside space,
    a floor panel partitioning the vehicle-inside space from a vehicle outside located below the vehicle-inside space; and
    a tunnel portion provided at the floor panel so as to project upwardly toward an inside of the vehicle-inside space, the tunnel portion extending in a vehicle longitudinal direction so as to have a longitudinal substantially-straight center line thereof,
    wherein said dash panel is formed to extend substantially upward from a front end portion of said floor panel, said electric motor is arranged in the vehicle-front side space partitioned from the vehicle-inside space by said dash panel, and a drive shaft coupling the electric motor to the front wheels is provided in front of the dash panel,
    said battery is arranged at a specified position, in a vehicle width direction, which is located on said longitudinal substantially-straight center line of the tunnel portion, and at least a front-side portion of the battery is arranged in the vehicle-front side space partitioned from the vehicle-inside space by said dash panel so that part of the front-side portion of the battery overlaps with said drive shaft in the vehicle longitudinal direction.

2. The battery arrangement structure of a vehicle of claim 1, wherein said battery is arranged so that a front-side part thereof is positioned in front of the dash panel and a rear-side part thereof is positioned inside of said tunnel portion in the vehicle longitudinal direction.

3. The battery arrangement structure of a vehicle of claim 1, wherein said battery is arranged so that a whole part thereof is positioned in front of the dash panel outside of the tunnel portion.

4. The battery arrangement structure of a vehicle of claim 1, further comprising a front seat and a rear seat which are provided on said floor panel, wherein said tunnel portion extends rearwardly from said dash panel to a specified position beside a lower end of a seatback of said front seat.

5. The battery arrangement structure of a vehicle of claim 1, wherein said battery is arranged so that a front lower end of the front-side portion thereof is positioned in front of and above said drive shaft.

6. The battery arrangement structure of a vehicle of claim 1, wherein said battery is mounted on a suspension support member supporting a suspension for a front wheel of the vehicle.

7. The battery arrangement structure of a vehicle of claim 1, wherein said battery is provided at a vehicle-body member attached to the vehicle so that the battery is movable rearwardly in said tunnel portion in accordance with a rearward collision load acting on the battery in a vehicle frontal collision.

8. The battery arrangement structure of a vehicle of claim 1, wherein said electric motor is an in-wheel type of motor which is directly connected to the front wheel of the vehicle.

9. The battery arrangement structure of a vehicle of claim 6, further comprising a pair of front side frames which is provided at both side portions of the vehicle so as to extend in the vehicle longitudinal direction, wherein said suspension support member comprises a sub frame connected to said front side frames and a battery support portion provided below said floor panel, and said sub frame and said battery support portion are formed integrally as a unit.

10. The battery arrangement structure of a vehicle of claim 7, wherein said battery is mounted on a suspension support member supporting a suspension for a front wheel of the vehicle via a slide-mount mechanism which allows the battery to move rearwardly relative to the suspension support member.

11. The battery arrangement structure of a vehicle of claim 7, wherein said battery is arranged to slant so that a rear end thereof is positioned below a front end thereof in a vehicle vertical direction.

12. A battery arrangement structure of a vehicle, comprising:
- an electric motor to drive front wheels and/or rear wheels of the vehicle;
- a battery to supply an electric power to the electric motor;
- a dash panel partitioning a vehicle-inside space from a vehicle-front side space located in front of the vehicle-inside space;
- a floor panel partitioning the vehicle-inside space from a vehicle outside located below the vehicle-inside space; and
- a tunnel portion provided at the floor panel so as to project upwardly toward an inside of the vehicle-inside space, the tunnel portion extending in a vehicle longitudinal direction so as to have a longitudinal substantially-straight center line thereof,
- wherein said battery is arranged at a specified position, in a vehicle width direction, which is located on said longitudinal substantially-straight center line of the tunnel portion, and at least a front-side portion of the battery is positioned in front of said dash panel in the vehicle longitudinal direction,
- wherein said electric motor is arranged in front of said dash panel, and at least part of the electric motor overlaps with said battery in the vehicle longitudinal direction.

13. A battery arrangement structure of a vehicle, comprising:
- an electric motor to drive front wheels and/or rear wheels of the vehicle;
- a battery to supply an electric power to the electric motor;
- a dash panel partitioning a vehicle-inside space from a vehicle-front side space located in front of the vehicle-inside space;
- a floor panel partitioning the vehicle-inside space from a vehicle outside located below the vehicle-inside space; and
- a tunnel portion provided at the floor panel so as to project upwardly toward an inside of the vehicle-inside space, the tunnel portion extending in a vehicle longitudinal direction so as to have a longitudinal substantially-straight center line thereof,
- wherein said battery is arranged at a specified position, in a vehicle width direction, which is located on said longitudinal substantially-straight center line of the tunnel portion, and at least a front-side portion of the battery is positioned in front of said dash panel in the vehicle longitudinal direction,
- wherein said electric motor is arranged in front of said battery so that at least part of the electric motor overlaps with the battery in an elevation view, and the electric motor is provided at a vehicle-body member attached to the vehicle so that the electric motor is movable rearwardly below the battery when receiving a rearward collision load in a vehicle frontal collision.

14. The battery arrangement structure of a vehicle of claim 13, wherein said battery is arranged to slant so that a front end thereof is positioned above a rear end thereof in a vehicle vertical direction.

15. The battery arrangement structure of a vehicle of claim 13, further comprising a sub frame provided in front of said dash panel, the sub frame being configured to deform when receiving the rearward collision load in the vehicle frontal collision, wherein said electric motor is mounted on said sub frame so that the electric motor is movable rearwardly below the battery in accordance with deformation of the sub frame.

16. The battery arrangement structure of a vehicle of claim 13, further comprising a drive shaft provided in a space between said electric motor and said battery, which extends in the vehicle width direction and is coupled to drive the front wheel, wherein said electric motor is coupled to said drive shaft via a shaft connection portion and configured to rotate around the drive shaft when receiving the rearward collision load in the vehicle frontal collision so that the electric motor is movable rearwardly below the battery.

17. The battery arrangement structure of a vehicle of claim 15, wherein said electric motor and said sub frame are connected via a connection portion, and said connection portion comprises a releasing mechanism to release connection between the electric motor and the sub frame when receiving the rearward collision load in the vehicle frontal collision.

18. The battery arrangement structure of a vehicle of claim 16, wherein a restriction portion to restrict a rearward move of said drive shaft to avoid interference of the drive shaft with said battery is provided in back of the drive shaft.

* * * * *